Patented Apr. 7, 1936

2,036,317

UNITED STATES PATENT OFFICE 2,036,317

PROCESS FOR THE PRODUCTION OF HYDRATED OLEFINES

Franklin A. Bent and Simon N. Wik, Berkeley, Calif.

No Drawing. Application July 18, 1934, Serial No. 735,843

23 Claims. (Cl. 260—156)

This invention relates to a process for the catalytic hydration of olefines and more particularly is concerned with those systems wherein at least a part of the hydrating agent is maintained in the liquid phase.

In the prior art will be found patents disclosing the preparation of alcohols and/or ethers by the direct hydration of olefines in the presence of catalytic agents and controlled or regulated quantities of steam or water. These catalytic agents comprise free acids as sulfuric, phosphoric, hydrochloric, boric, benzene sulfonic, etc., their alkali-metal-, alkaline earth metal- and heavy metal salts and the like. A common disadvantage inherent in all these known procedures is the relatively high corrosion rate of the catalytic bodies on the metal parts of the hydrating equipment. Consequently resort has been had to special equipment to obviate such losses which invariably results in higher capital charges. As an attendant feature of the corrosion factor is the loss of catalyst due to reaction with the metal parts of the equipment which loss is reflected in the resulting diminishing yields of hydration product based on olefine input.

We have discovered that the hydration reaction can be conducted in ordinary apparatus made of carbon steel, iron and the like without loss of catalyst and in the absence of corrosion or with the substantial inhibition thereof by means of suitable agents which contain organic nitrogen.

We have discovered that ordinary and inexpensive equipment can be resorted to without corrosion and catalyst losses and without diminished yields of end-product when there is present in the hydrating unit an organic nitrogen base or its salt. When the salt of an organic nitrogen base is employed it may be used in lieu of or in addition to the conventional catalytic material since the former appears to possess catalytic properties in addition to its corrosion inhibiting property. Besides, its use per se results in the avoidance of undesirable side reactions including polymerization of the olefines. When the organic nitrogen base per se is utilized, it is preferably employed in conjunction with an acid acting catalyst which may comprise free acid or a compound capable of yielding catalytic acid ions in the presence of water.

Suitable organic nitrogen bases are: the mono or poly aliphatic, aralkyl, carbocyclic and heterocyclic amines whether of primary, secondary or tertiary character as butyramine, isopropylamine, diethylamine, methyl ethylamine, trimethyl amine, diethyl methyl amine, aniline, naphthylamine, diphenylamine, ethyl aniline, dimethylaniline, diethyl benzylamine, 2-amino pyridine, ethylene diamine, phenylene diamine, benzidine, 2:6 diamino pyridine, etc; amides as acetamide, the mixed amides of vegetable and animal oils, fats and waxes as those of coconut oil, sardine oil, castor oil, soya bean oil, etc. acetanilide, benzamide, urea, and the like, and particularly cyclic nitrogen bases as pyrrole, indole, pyridine, quinoline, piperidine, pyrazole, naphtho-quinoline, the azines whether di-, tri-, ox- or thiazines, including those containing the cyanuric nucleus, the purines, those containing the barbituric acid nucleus or its derivatives, the acridines, the acridones, the azoles whether simple, thio-, oxo- or triazoles, etc. The saturated or unsaturated homologues, analogues and substitution products (e. g. containing acid, hydroxyl, halogen and/or other substituents) of the above and like nitrogen base compounds as well as the organic quaternary ammonium bases and their salts may be used provided the compound or compounds, when used as admixtures, is or are basic acting in the presence of water.

Suitable salts of the nitrogen bases are the sulfates, phosphates, halides, borates, sulfonates, oxalates, chloracetates, etc. of the above. Especially suitable are those salts of cyclic nitrogen bases as pyridine, quinoline, etc. which contain nitrogen in the ring and which possess an acid radical which, in the free state, is capable of acting as a hydration catalyst. Very good results are obtained with the relatively water-soluble nitrogen base salts. Salts of quinoline and those of nitrogen bases derived from mineral oils, and their products, such as from petroleum sludge acid, and the like, accelerate the hydration reaction.

These nitrogen bases and/or their salts may be used in the form of the pure chemical individuals or mixtures thereof, or as crude products or heterogeneous mixtures of uncertain composition, for example, obtainable as, or from, the acid extract of coal tar, petroleum oil, cracked distillates, and like nitrogen containing materials. These bases and/or their salts may be employed either alone or in admixture with other materials which may or may not be themselves catalysts for the hydration of olefines, as for example with zinc sulfate and/or sulfuric acid, etc.

Although we prefer to use in our process those nitrogen containing bodies which are relatively soluble in water under the conditions of hydration employed, those which are not thus soluble may be used in the form of dispersions or suspensions—preferably colloidal. Furthermore the solubility of many desirable nitrogen bases may be increased and their effectiveness thereby enhanced by the addition of acid.

Our process is applicable to ethylene, secondary and/or tertiary olefines. We may operate with a pure olefine or olefinic mixtures. Instead of pure compounds, we may work with impure individual compounds or their admixtures such as occur in natural gas or such as are obtained by cracking or by pyrolytic treatment of petroleum products or other natural carboniferous materials. Suitable fractions may be employed, such as paraffin and olefine hydrocarbons consisting essentially of, or predominating in, compounds of the same number of carbon atoms to the molecule, such as an ethane-ethylene, a propane-propylene, or a butane-butylene fraction and the like. Where desired, the tertiary olefine content may be first selectively removed prior to the hydration of the ethylene and/or secondary olefine or olefines. The presence of paraffin hydrocarbons or other inert gases is useful in sweeping out of the reaction mixture a part, at least, of the hydration product as it is formed and so preventing the establishment of equilibrium between the olefine and water. Our process is not restricted to the use of olefines in the gaseous or vaporous state, although such physical state is preferred. Our reaction can be conducted with the hydrocarbons in the liquid phase.

The operating conditions of our process are quite flexible, but the results obtained are influenced by several interdependent factors such as the pressure and temperature employed, the character and concentration of the nitrogen containing base or bases chosen, the reactivity of the olefine or olefines present, the time of reaction allowed which in continuous operation, for example, may be regulated by the rate of olefine throughput, etc.

The pressure may be atmospheric or elevated but the preferable lower limit is a pressure slightly above the vapor pressure of water at the operating temperature so that the water will always be present in the liquid phase. Increased pressure shifts the equilibrium toward the alcohol side and is also advantageous in permitting increased throughput, resulting in greater mechanical efficiency of the apparatus employed. Pressures as high as 10,000 lbs. per sq. in. can be resorted to.

The optimum operating temperature will depend on the olefine undergoing hydration and on the nature and concentration of the nitrogen base and/or nitrogen base salt, as well as on the character and concentration of the hydration catalyst which may be present. In order to maintain water in the liquid phase the critical temperature for water cannot be exceeded. The hydration rate increases with the temperature but we prefer to operate at below about 350° C. as temperatures substantially higher tend to favor dehydration of the alcohols formed. A lower practical temperature limit is about 100° C. although the process can be practiced at still lower temperatures.

Among the nitrogen base salts it may in general be said that the salts of strong acids are more active catalysts than the corresponding weak acid salts. The nature of the nitrogen base is also of influence, thus bases containing cyclic nitrogen are usually more effective than the simpler aliphatic nitrogen containing compounds.

The rate of olefine hydration increases with the concentration of the nitrogen base salt up to a maximum which differs for different nitrogen base salts. A practical range of nitrogen base salt concentration is from about 0.1 to about 25% solution or suspension in the hydrating water. But we have obtained very good results in a narrower range from about 0.1 to 10% and also from about 5% to 10%.

While we have emphasized nitrogen bases and their salts per se, improved results may obviously be obtained by the addition of nitrogen bases to acid-acting catalyst solutions.

For purposes of illustration only, reference will be had to the following examples of applications of our invention to the production of isopropyl alcohol and secondary butyl alcohol. But it will be understood that many widely different embodiments of this invention are possible without departing from the spirit thereof.

*Example 1*

A mixture of propylene and propane containing about 35% propylene was passed at a pressure of about 3,000 pounds per square inch through a solution containing approximately 5 grams of quinoline sulfate and 100 grams of water at a temperature of about 225° C. The exit gas was totally condensed at 25° C. and collected in a separator. Two liquid layers were formed, the lower containing water and isopropyl alcohol and the upper containing propane, isopropyl alcohol, unconverted propylene and some free quinoline. The upper layer was recirculated through the catalyst liquor until approximately 80% of the propylene was converted to isopropyl alcohol.

By employing a temperature of 286° C. equally good yields of ethyl alcohol have been obtained from ethylene-ethane mixtures using a 5% solution of quinoline sulfate as the catalytic hydrating agent. Moreover similar results in both cases may be obtained by the use of aniline sulfate and the like in place of the quinoline sulfate.

*Example 2*

A mixture of butene 1, butene 2 and butane containing about 40% butylenes, was contacted at a pressure of about 3,000 pounds per square inch with a 10% solution in water of a sludge obtained in the refining of heavy petroleum oil with $H_2SO_4$ and containing 25% ether-soluble constituents comprising nitrogen base compounds. The catalyst liquid was maintained at a temperature of about 286° C. A yield of secondary butyl alcohol equal to 40% of the equilibrium concentration possible under these conditions was obtained. The alcohol was separated and the unused butylene returned to the process as described in Example 1.

By substituting quinaldine sulfate, its homologues and/or analogues, and the like for the sludge mixture, similar results may be obtained.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process of hydrating an olefine which comprises catalytically hydrating an olefine with water in the presence of a compound of the class consisting of organic nitrogen bases and organic nitrogen base salts at a pressure and at a temperature at which substantial hydration of the olefine is effected.

2. A process of hydrating an olefine which comprises catalytically hydrating an olefine with water in the presence of an organic nitrogen base at a pressure and at a temperature at which substantial hydration of the olefine is effected.

3. A process of hydrating an olefine which comprises catalytically hydrating an olefine with water in the presence of an organic nitrogen base salt at a pressure and at a temperature at which substantial hydration of the olefine is effected.

4. A process of hydrating an olefine which comprises catalytically hydrating an olefine with water in the presence of a salt formed by the reaction of an organic nitrogen base with a relatively strong mineral acid at a pressure and at a temperature at which substantial hydration of the olefine is effected.

5. A process of hydrating an olefine which comprises catalytically hydrating an olefine with water in the presence of a heterocyclic nitrogen base at a pressure and at a temperature at which substantial hydration of the olefine is effected.

6. A process of hydrating an olefine which comprises catalytically hydrating an olefine with water in the presence of a heterocyclic nitrogen base salt at a pressure and at a temperature at which substantial hydration of the olefine is effected.

7. A process of hydrating an olefine which comprises catalytically hydrating an olefine with water in the presence of a compound of the class consisting of organic nitrogen bases and organic nitrogen base salts contained in the hydrating medium at a pressure and at a temperature at which substantial hydration of the olefine is effected.

8. A process of hydrating an olefine which comprises catalytically hydrating an olefine in the presence of an aqueous solution of a compound of the class consisting of organic nitrogen bases and organic nitrogen base salts at a pressure and at a temperature at which substantial hydration of the olefine is effected.

9. A process of hydrating an olefine which comprises catalytically hydrating an olefine with water in the presence of an organic nitrogen base salt contained in the hydrating medium at a pressure and at a temperature at which substantial hydration of the olefine is effected.

10. A process of hydrating an olefine which comprises catalytically hydrating an olefine in the presence of an aqueous solution of an organic nitrogen base salt at a pressure and at a temperature at which substantial hydration of the olefine is effected.

11. A process of hydrating an olefine which comprises catalytically hydrating an olefine with water in the presence of a compound containing the quinoline nucleus at a pressure and at a temperature at which substantial hydration of the olefine is effected.

12. A process of hydrating an olefine which comprises catalytically hydrating an olefine with water in the presence of a compound containing the pyridine nucleus at a pressure and at a temperature at which substantial hydration of the olefine is effected.

13. A process of hydrating an olefine which comprises catalytically hydrating an olefine with water in the presence of nitrogen base containing sludge at a pressure and at a temperature at which substantial hydration of the olefine is effected.

14. A process of hydrating an olefine which comprises catalytically hydrating an olefine with water in the presence of an organic quaternary ammonium base compound at a pressure and at a temperature at which substantial hydration of the olefine is effected.

15. A process of hydrating an olefine which comprises catalytically hydrating an olefine with water in the presence of a sulfate of a heterocyclic nitrogen base at a pressure and at a temperature at which substantial hydration of the olefine is effected.

16. A process of hydrating an olefine which comprises catalytically hydrating an olefine under superatmospheric pressure and at a temperature sufficient to effect substantial hydration of the olefine in the presence of a compound of the class consisting of organic nitrogen bases and organic nitrogen base salts.

17. A process of hydrating an olefine which comprises catalytically hydrating an olefine at an elevated temperature sufficient to effect substantial hydration of the olefine in the presence of a compound of the class consisting of organic nitrogen bases and organic nitrogen base salts and water in the liquid phase.

18. A process of hydrating propylene which comprises reacting propylene with water in the presence of a compound of the class consisting of organic nitrogen bases and organic nitrogen base salts at a pressure and at a temperature at which substantial hydration of the olefine is effected.

19. A process of hydrating an olefine which comprises catalytically hydrating an olefine with water in the presence of an organic nitrogen base sulfate at a pressure and at a temperature at which substantial hydration of the olefine is effected.

20. A process of hydrating ethylene which comprises reacting ethylene with water in the presence of a compound of the class consisting of organic nitrogen bases and organic nitrogen base salts at a pressure and at a temperature at which substantial hydration of the olefine is effected.

21. A process for the production of an hydration product of an olefine which comprises contacting water in the liquid phase, and an olefine in the presence of an hydration catalyst comprising a compound of the class consisting of organic nitrogen bases and organic nitrogen base salts at a pressure and at a temperature at which hydration of at least a part of said olefine takes place.

22. A process for the production of an hydration product of an olefine, which comprises heating said olefine and water in the liquid phase under a pressure greater than atmospheric to a temperature greater than about 100° C. but below about 350° C. in the presence of a catalytic hydration agent comprising a compound of the class consisting of organic nitrogen bases and organic nitrogen base salts.

23. A process for the production of an hydration product of an olefine, which comprises heating said olefine and water to a temperature between about 100° C. and about 350° C. under a pressure at which water is present in the liquid phase in the presence of an organic nitrogen base salt.

FRANKLIN A. BENT.
SIMON N. WIK.